United States Patent [19]
Wolfe, Jr.

[11] 3,891,604
[45] June 24, 1975

[54] SEGMENTED THERMOPLASTIC COPOLYESTER ELASTOMER

[75] Inventor: James Richard Wolfe, Jr., Wilmington, Del.

[73] Assignee: E. I. du Pont de Nemours & Company, Wilmington, Del.

[22] Filed: Nov. 29, 1973

[21] Appl. No.: 419,975

[52] U.S. Cl. ........ 260/75 R; 260/40 R; 260/45.9 R; 260/75 S
[51] Int. Cl. ............................................ C08g 17/08
[58] Field of Search ........................... 260/75 R, 860

[56] References Cited
UNITED STATES PATENTS

| | | | |
|---|---|---|---|
| 2,650,211 | 8/1953 | Dannenberg et al. | 260/75 R |
| 3,265,762 | 8/1966 | Quisenberry | 260/860 |
| 3,542,737 | 11/1970 | Keck et al. | 260/75 R |
| 3,651,014 | 3/1972 | Witsiepe | 260/75 R |

*Primary Examiner*—Melvin Goldstein
*Assistant Examiner*—W. C. Danison, Jr.

[57] ABSTRACT

A segmented thermoplastic copolyester elastomer containing recurring polymeric long chain ester units and short chain ester units. The long chain ester units are derived from dicarboxylic acids and poly(alkylene oxide) glycols. The segmented copolyester contains about 25–90 percent by weight of at least two short chain ester units, about 45–95 percent of the total of all short chain ester units have no side chain and have a melting point of at least 150°C. if in the form of a high molecular weight polymer derived only from short chain ester units. About 5 to 55 percent of the total of all short chain ester units have side chains, said side chains having a length between 7 and 25 carbon atoms.

11 Claims, No Drawings

SEGMENTED THERMOPLASTIC COPOLYESTER ELASTOMER

BACKGROUND OF THE INVENTION

Linear thermoplastic copolyetheresters have been suggested heretofore for a variety of uses, particularly for the production of films and fibers. Most of the known polymers of this type are not suitable for certain specialty applications such as, for example, impact absorbers, coated fabrics, low pressure tubing and other uses where low hardness and modulus combined with high tear strength, high melting points, rapid crystallization rate, and good flexibility are needed.

SUMMARY OF THE INVENTION

According to this invention there is provided a thermoplastic copolyetherester which possesses these desired properties.

The copolyetherester, itself, is a thermoplastic copolyetherester consisting essentially of a multiplicity of recurring intralinear long chain and short chain ester units connected head-to-tail through ester linkages, said long chain ester units being represented by at least one of the following structures:

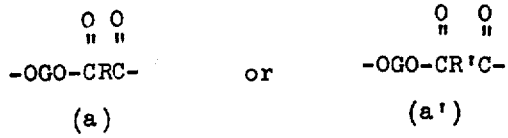

and said short chain ester units being represented by the following structure:

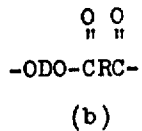

in conjunction with at least one of the following structures:

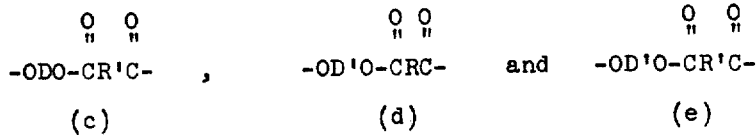

wherein:

G is a divalent radical remaining after removal of terminal hydroxyl groups from poly(alkylene oxide) glycols having a carbon-to-oxygen ratio of about 2.0—4.3 and a molecular weight between about 400 and 6000;

R is a divalent radical remaining after removal of carboxyl groups from a dicarboxylic acid having a molecular weight less than about 300;

R' is a divalent radical remaining after removal of carboxyl groups from a dicarboxylic acid having attached to it at least one side chain having a length of 7 to about 25 carbon atoms, said carboxylic acid R' having a molecular weight of less than about 300 neglecting the side chains;

D is a divalent radical remaining after removal of hydroxyl groups from a low molecular weight diol having a molecular weight less than about 250; and D' is a divalent radical remaining after removal of hydroxyl groups from a low molecular weight diol having at least one side chain having a length of about 7 to 25 carbon atoms, said D' having a molecular weight of less than about 250 neglecting the side chains. Short chain ester units make up 25–90 percent by weight of the copolyester.

Ester units with side chains make up about 5 to 55 percent of the total short chain ester units. About 40 to 95 percent of the total short chain ester units have no long side chains and a polymer consisting only of such short chain ester units which have no side chains in the fiber forming molecular weight range, e.g., in excess of about 5,000 would have a melting point of at least about 150°C.

DETAILED DESCRIPTION

The term "long chain ester units" as applied to units in a polymer chain refers to the reaction product of a long chain glycol with a dicarboxylic acid. Such "long chain ester units", which are a repeating unit in the copolyetheresters of this invention, correspond to formula (a) or (a') above. The long chain glycols are polymeric glycols having terminal (or as nearly terminal as possible) hydroxyl groups and a molecular weight from about 400–6000. The long chain glycols used to prepare the copolyetheresters of this invention are poly-(alkylene oxide) glycols having a carbon-to-oxygen ratio of about 2.0–4.3. Representative long chain glycols are poly(ethylene oxide) glycol, poly(1,2- and 1,3-propylene oxide) gylcol, poly-(tetramethylene oxide) glycol, random or block copolymers of ethylene oxide and 1,2-propylene oxide, and random or block copolymers of tetrahydrofuran with minor amounts of a second monomer such as 3-methyltetrahydrofuran (used in proportions such that the carbon-to-oxygen mole ratio in the glycol does not exceed about 4.3). The carbon to oxygen ratio of about 2.0–4.3 is meant to include lower molecular weight glycols in which the carbon to oxygen ratio is 1.8 since the 2.0 to 4.3 ratio does not take into account the elements of water, which are present in the glycol in addition to the alkylene oxide units, but are split out and are not part of the polymer.

The term "short chain ester units" as applied to units in a polymer chain refers to low molecular weight, neglecting side chains, polymer chain units. They are made by reacting a low molecular weight diol (below about 250 neglecting side chains if present) with a dicarboxylic acid molecular weight below about 300 neglecting side chains if present to form ester units represented by the formulae (b), (c), (d) and (e) above. At least two different types of short chain ester units are to be utilized. One unit (formula (b)) contains no side chains. The other units are at least one of the units represented by the formulae (c), (d) and (e) above.

Included among the low molecular weight diols which do not contain the side chains (formulae (b) and (c)) are acyclic and alicyclic dihydroxy compounds. Preferred are diols with 2–15 carbon atoms such as ethylene, propylene, tetramethylene, pentamethylene, 2,2-dimethyltrimethylene, hexamethylene, and decamethylene glycols, dihydroxy cyclohexane, cyclohexane dimethanol, etc. Especially preferred are aliphatic diols containing 2–8 carbon atoms. Equivalent ester-forming derivatives of diols are also useful (e.g., ethylene oxide or ethylene carbonate can be used in place of ethylene glycol). The term "low molecular weight diols" as used herein should be construed to include such equivalent ester-forming derivatives as diacetates; provided, however, that the molecular weight requirement pertains to the diol only and not to its derivatives.

Regarding the low molecular weight diols which react to form the short chain ester units containing the side chains (formulae (d) and (e)) which are at least 7 to 25 carbon atoms in length and preferably 8 to 22 carbon atoms in length the diols which are utilized should have a molecular weight of less than about 250 excluding the contribution to molecular weight provided by the side chain. The side chains can be aliphatic or cycloaliphatic; they can contain one or more oxygen atoms as an additional element but at least 2 carbon atoms must be present between oxygens; they can contain benzene rings, they can contain one or more double bonds, they can be straight chain or branched and finally compounds derived by removing the side chain from the diol and replacing the free bond of the chain with a hydrogen atom should have a melting point of less than 100°C. In determining the chain length of branched chains, the longest chain should be considered. When the chain contains cycloaliphatic or aromatic rings, the number of carbons in the shortest path along the chain should be considered; e.g., 1,2-cyclo-derivatives contribute two carbon atoms.

Representative diols having side chains include the previously mentioned low molecular weight diols substituted with one or more side chains.

Specific examples of suitable long chain diols include 3-octadecyloxy-1,2-propanediol, dodecanediol-1,2,3-octadec-9-enyloxy-1,2-propanediol, N,N-bis(2-hydroxyethyl)stearamide, 3-octylhexanediol-1,6,2-tetradecyl propanediol-1,3,2-ethyl-2-(1-dodecenyloxy) propanediol-1,3,2-n-octadecylbutanediol-1,4 and 2,3-dihexadecyl-butanediol-1,4.

Dicarboxylic acids without side chains which are reacted with the foregoing diols and poly(alkylene oxide) glycols to produce the copolyetheresters of this invention are aliphatic, cycloaliphatic, or aromatic dicarboxylic acids of a low molecular weight, i.e., having a molecular weight of less than about 300. The term "dicarboxylic acids" as used herein, includes equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyester polymer formation and use of the polymer of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as —O— or —SO$_2$—.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethylmalonic acid, allylmalonic acid, 4-cyclohexene-1,2-dicarboxylic acid, 2-ethylsuberic acid, 2,2,3,3-tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4'-methylenebis(cyclohexane carboxylic acid), 3,4-furan dicarboxylic acid, and 1,1-cyclobutane dicarboxylic acid. Preferred aliphatic acids are cyclohexane dicarboxylic acids and adipic acid.

Representative aromatic dicarboxylic acids which can be used include terephthalic, phthalic and isophthalic acids, bibenzoic acid, substituted dicarboxy compounds with two benzene nuclei such as bis(p-carboxyphenyl)methane, p-oxy(p-carboxy-phenyl) benzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and $C_1$–$C_6$ alkyl and ring substitution derivatives thereof, such as halo, alkoxy, and aryl derivatives. Hydroxyl acids such as p($\beta$-hydroxyethoxy) benzoic acid can also be used providing an aromatic dicarboxylic acid is also present.

Aromatic dicarboxylic acids are a preferred class for preparing the copolyester polymers of this invention. Among the aromatic acids, those with 8–16 carbon atoms are preferred, particularly the phenylene dicarboxylic acids, i.e., terephthalic, and isophthalic acids. As mentioned previously the esters of the phenylene dicarboxylic acids and in particular their dimethyl esters are included within the scope of the term dicarboxylic acid.

A portion of the dicarboxylic acid may also have at least one side chain extending from it (formulae (a'), (c) and (e)). The side chains present in the acid must have the same characteristics as those described hereinbefore for the low molecular weight diols having side chains. The previously mentioned dicarboxylic acids may be utilized with the addition of the above-mentioned side chains. The molecular weight of the dicarboxylic acid should, however, not be above about 300 excluding the contribution of the side chain.

The side chain may be present as a substituent in either the aliphatic or aromatic dicarboxylic acids previously mentioned.

Specific examples of suitable long chain acids include substituted succinic acids having alkyl or alkenyl radicals of 8–24 carbon atoms in the α-position, 2-(1-dodecyloxy) terephthalic acid, 2-octyl adipic acid, octadecylmalonic acid, 2-decyl-3-tridecyl succinic acid, 3-decyl-phthalic acid and 1-dodecyl-1,2-cyclohexane dicarboxylic acid.

A preferred class of dicarboxylic acids having side chains are α-substituted succinic acids which may be used as the diacid, the anhydride or diester. The α-substituents are alkyl or alkenyl radicals containing from 8 to 24 carbon atoms.

When a low molecular weight diol is used to provide the required side chains, the long chain ester units are free of side chains. When an acid provides the side chain up to about 55 percent of the long chain ester units will contain side chains. Regarding the short chain ester units about 5 to 55 percent must contain the side chains, preferably 10 to 50 percent.

The short chain ester units (the total of those with and without side chains) will make up about 25 to 90 percent by weight of the copolyetherester. A polymer of the short chain ester units which have no side chains should have a melting point of at least about 150°C.

The most preferred copolyetheresters of the instant invention are those prepared from poly(tetramethylene oxide) glycol having a molecular weight of about 600–2000, ethylene glycol or butanediol-1,4, terephthalic acid and a diol or dicarboxylic acid having an aliphatic side chain length of 8 to 22 carbon atoms. A preferred class of dicarboxylic acid is the α-alkyl or α-alkenyl succinic acids as previously mentioned.

The dicarboxylic acids or their derivatives and the polymeric glycol are incorporated into the final product in the same molar proportions as are present in the reaction mixture. The amount of low molecular weight diol actually incorporated corresponds to the difference between the moles of diacid and polymeric glycol present in the reaction mixture. When mixtures of low molecular weight diols are employed, the amounts of each diol incorporated is largely a function of the amounts of the diols present, their boiling points, and relative reactivities. Low molecular weight diols with side chains often are sufficiently high boiling that they are incorporated in amounts approaching those initially introduced into the reaction mixture. The total amount of diol incorporated is still the difference between moles of diacid and polymeric glycol.

The polymers described herein can be made conveniently by a conventional ester interchange reaction which takes place in the presence of a stabilizer such as 4,4'-bis(α,α-dimethylbenzyl) diphenylamine.

A preferred procedure involves heating the dimethyl ester of terephthalic acid with a long chain glycol and a molar excess of low molecular weight diol in the presence of a catalyst at about 150°–260°C. and a pressure of 0.5 to 5 atmospheres, preferably ambient pressure, while distilling off methanol formed by the ester interchange. In addition, suitable amounts of a diester having side chains and/or a diol having side chains must be present. Depending on temperature, catalyst, glycol excess, and equipment, this reaction can be completed within a few minutes, e.g., 2 minutes to a few hours, e.g., 2 hours.

Concerning the molar ratio of reactants, at least about 1.1 mole of diol should be present for each mole of acid, preferably at least about 1.25 mole of diol for each mol of acid. The long chain glycol and side chain-bearing intermediates should be present in amounts corresponding to the composition limits previously set out hereinbefore.

This procedure results in the preparation of a low molecular weight prepolymer which can be carried to the high molecular weight copolyetherester of this invention by the procedure described below. Such prepolymers can also be prepared by a number of alternate esterification or ester interchange processes; for example, the long chain glycol can be reacted with a high or low molecular weight short chain ester copolymer in the presence of catalyst until randomization occurs. The short chain ester copolymer can be prepared by ester interchange from either the dimethyl esters and low molecular weight diols, as above, or from the free acids with the diol acetates. Alternatively, the short chain ester copolymer can be prepared by direct esterification from appropriate acids, anhydrides, or acid chlorides, for example, with diols or by other processes such as reaction of the acids with cyclic ethers or carbonates. Obviously, the prepolymer might also be prepared by running these processes in the presence of the long chain glycol.

The resulting prepolymer is then carried to high molecular weight by distillation of the excess of short chain diol. This process is known as "polycondensation."

Additional ester interchange occurs during this polycondensation which serves to increase the molecular weight and to randomize the arrangement of the copolyetherester units. Best results are usually obtained if this final distillation or polycondensation is run at less than about 5mm. pressure and about 200°–270°C. for less than about four hours, e.g., 1 to 3 hours. It is preferred that a stabilizer such as 4,4'-bis-(α,α-dimethylbenzyl)diphenylamine be present during the polycondensation preferably in the amount of about 0.05 to 2.0 percent by weight.

Most practical polymerization techniques rely upon ester interchange to complete the polymerization reaction. In order to avoid excessive hold time at high temperatures with possible irreversible thermal degradation, a catalyst for the ester interchange reaction should be employed. While a wide variety of catalysts can be employed, organic titanates such as tetrabutyl titanate used along or in combination with magnesium or calcium acetates are preferred. Complex titanates, such as $Mg[HTi(OR)_6]2$, derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

The catalyst should be present in the amount of 0.005 to 0.2 percent by weight based on total reactants.

Ester interchange polymerizations are generally run in the melt without added solvent, but inert solvents can be used to facilitate removal of volatile components from the mass at low temperatures. This technique is especially valuable during prepolymer preparation, for example, by direct esterification. Both batch and continuous methods can be used for any stage of copolyester polymer preparation. Polycondensation of prepolymer can also be accomplished in the solid phase by heating divided solid prepolymer in a vacuum or in a stream of inert gas to remove liberated low molecular weight diol. This method has the advantage of reducing degradation because it must be used at temperatures below the softening point of the prepolymer.

A stabilizer if used may be added at any time during the preparation of the copolyetherester. It is particularly preferred that a stabilizer be present during the polycondensation aspect of the reaction in an amount of at least about 0.05 percent by weight based on the estimated yield of copolyetherester product, preferably in an amount of 0.05 to 2.0 percent by weight. In commercial scale equipment it is preferred that the stabilizer be present at any point in the process where the poly(alkylene oxide) glycol is exposed to elevated temperatures.

Other stabilizers which may be utilized include 1,3,5-tris-(3,5-di-tert-butyl-4-hydroxyhydrocinnamoyl)-hexahydro-S-triazine.

It is essential to the instant invention that there be at least two types of diols and/or at least two types of dicarboxylic acids in the backbone distributed randomly throughout the polymer.

When the polymer is prepared with a single dicarboxylic acid and two diols, one bearing side chains, only long chain ester units corresponding to formula (a) will be present and short chain ester units corresponding to (b) and (d) will be present.

When two acids, one bearing side chains, and a single diol are used, long chain ester units (a) and (a') and short chain ester units (b) and (c) will be present.

When two acids and two diols, one of each pair bearing side chains are used, long chain ester units (a) and (a') and short ester units (b), (c), (d) and (e) will be present.

For purposes of determining the number of short chain ester units bearing side chains it is assumed that all species are of equal reactivity and the various units are present in statistical amount. For example, polymers containing equimolar amounts of low molecular diols, one with and one without side chains, would be assumed to contain with regard to total short chain ester units 50 percent of short chain ester units with side chains. The same is true for a mixture of two dicarboxylic acids with one diol. In the situation where the polymers contained units derived from 3 moles of dicarboxylic acid without a side chain, 1 mole of acid with a side chain, 3 moles of diol without a side chain and 1 mole of diol with a side chain, it would be assumed that the polymer contained with regard to total short chain ester units about 44 percent short chain ester units with side chains of which about 6 percent would be derived from both side chain-bearing acid and diol.

The properties of these copolyetheresters can also be modified by incorporation of various conventional inorganic fillers such as carbon black, silica gel, alumina, clays and chopped fiber glass. In general, these additives have the effect of increasing the modulus of the material at various elongations. Compounds having a range of hardness values can be obtained by blending hard and soft copolyetheresters of this invention.

All parts, proportions and percentages disclosed herein are by weight unless otherwise indicated.

The following examples further illustrate the invention:

EXAMPLES

The following ASTM methods are employed in determining the properties of the polymers prepared in the Examples which follow:

| | |
|---|---|
| Modulus at 100% elongation*, $M_{100}$ | D412 |
| Modulus at 300% elongation*, $M_{300}$ | D412 |
| Tensile at Break*, $T_B$ | D412 |
| Elongation at Break*, $E_B$ | D412 |
| Hardness, Shore D | D1484 |
| Tear Strength** | D470 |

*Cross-head speed 2"/minute if not stated otherwise.
**Modified by use of 1.5" × 3" sample with 1.5" cut on the long axis of the sample. This configuration prevents "necking down" at the point of tearing. A cross-head speed of 50"/min. is used.

Inherent viscosities of the polymers in the following examples are measured at 30°C at a concentration of 0.1g./dl. in m-cresol.

Polymer melting points are determined by means of a differential screening colorimeter.

EXAMPLE 1

The following materials are placed in a 400 ml reaction kettle fitted for distillation:

| | |
|---|---|
| Poly(tetramethylene ether) glycol; number average molecular weight about 2000 | 15.1 gm |
| 1,4-Butanediol | 18.4 gm |
| Dimethyl terephthalate | 17.9 gm |
| Hexadecylsuccinic anhydride | 16.6 gm |
| 4,4'-Bis($\alpha,\alpha$-dimethylbenzyl)diphenyl amine | 0.55 gm |

A stainless steel stirrer with a paddle cut to conform with the internal radius of the flask bottom and with a circular baffle ½ inch less in diameter than the inside of the flask is positioned with the paddle at the botton of the flask and the baffle about 2-½ inches above the bottom of the flask. Air in the flask is replaced with nitrogen. The flask is placed in an oil bath heated to a temperature of about 160°C. After the reaction mixture liquefies, 0.36 ml of catalyst solution is added. Agitation is initiated. Methanol distills from the reaction mixture as the temperature of the oil bath is raised to 255° ± 5°C. over a period of about 50 minutes. When the temperature reaches 255°C ± 5°C. the pressure in the flask is gradually reduced to 0.1 mm of Hg or less over a period of about 40 minutes. The polymerization mass is stirred at 255° ± 5°C. at less than 0.1 mm of Hg until the viscosity of the reaction mixture no longer increases. This usually requires about 1–3 hours. The resulting viscous molten product is scraped from the flask in a nitrogen (water and oxygen free) atmosphere and allowed to cool. From the ratios of starting materials the copolymer is calculated to have the composition 35 percent (wt)tetramethylene terephthalate/35 percent wt(tetramethylene hexadecylsuccinate-19 percent (wt)poly(tetramethylene ether)terephthalate/11 percent (wt)poly(tetramethylene ether) hexadecylsuccinate. The properties of the copolymer are listed in Table I under Column A. Physical properties were obtained on copolymer compression molded at about 215°C.

The catalyst solution employed in this example and subsequent examples is prepared as follows: Magnesium diacetate tetrahydrate is dried for twenty-four hours at 150°C under vacuum with a nitrogen bleed. A mixture of 11.2 gm of the dried magnesium diacetate and 200 ml of methanol is heated at reflux for 2 hours. The mixture is cooled and 44.4 ml of tetrabutyl titanate and 150 ml of 1,4-butanediol are added with stirring.

EXAMPLE 2

The copolymerization is carried out in a manner similar to that of Example 1 using the following materials:

| | |
|---|---|
| Poly(tetramethylene ether) glycol; number average molecular weight about 2000 | 15.0 gm |
| 1,4-Butanediol | 17.3 gm |
| Dimethyl terephthalate | 17.9 gm |
| 2-Docosenylsuccinic anhydride | 17.5 gm |
| 4,4'-Bis(α,α-dimethylbenzyl)diphenyl amine | 0.55 gm |

From the ratios of starting materials the copolymer is calculated to have the composition 35 percent(wt)tetramethylene terephthalate/35 percent(wt)tetramethylene 2-docosenylsuccinate/19.8 percent (wt)poly(tetramethylene ether)terephthalate/10.2 percent (wt) poly(tetramethylene ether) 2-docosenylsuccinate.

Physical properties were obtained on copolymer samples compression molded at about 230°C. Copolymer properties are listed in Table I under Column B.

Table I

| Polymer | A | B |
|---|---|---|
| % Short chain ester units with side chains | 35.7 | 31.5 |
| Inherent viscosity | 1.5 | 1.1 |
| $M_{100}$ | 570 | 605 |
| $M_{300}$ | 695 | 850 |
| $T_B$ | 4650 | 5600 |
| $E_B$ | 995 | 905 |
| DSC m.p. (°C) | 137 | 142 |
| Shore D hardness | 29 | 30 |
| Tear 50 in/min | 445 | 414 |

EXAMPLE 3

The copolymerization is carried out in a manner similar to that of Example 1 using the following materials:

| | |
|---|---|
| Poly(tetramethylene ether) glycol; number average molecular weight about 2000 | 20.1 gm |
| 1,4-Butanediol | 15.4 gm |
| Dimethyl terephthalate | 15.8 gm |
| Octadecylsuccinic anhydride | 14.8 gm |
| 4,4'-Bis(α,α-dimethylbenzyl)diphenyl amine | 0.55 gm |

From the ratios of starting materials the copolymer is calculated to have the composition 30 percent (wt)tetramethylene terephthalate/30 percent (wt)tetramethylene octadecylsuccinate/25.5 percent (wt)poly(tetramethylene ether)terephthalate/14.5 percent (wt)poly(tetramethylene ether) octadecylsuccinate.

Physical properties were obtained on copolymer samples compression molded at about 215°C. Copolymer properties are as follows:

| | |
|---|---|
| Inherent viscosity | 2.0 |
| $M_{100}$ | 410 |
| $M_{300}$ | 590 |
| $T_B$ | >4720 |
| $E_B$ | >900 |
| DSC m.p. (°C) | 125 |
| Shore D hardness | 26 |
| Tear strength, 50 in/min | 370 |

EXAMPLE 4

The copolymerization is carried out in a manner similar to that of Example 1 using the following materials:

| | |
|---|---|
| Poly(tetramethylene ether) glycol; number average molecular weight about 976 | 22.6 gm |
| 1,4-Butanediol | 16.9 gm |
| Dimethyl terephthalate | 23.0 gm |
| Octylsuccinic anhydride | 6.4 gm |
| 4,4'-Bis(α,α-dimethylbenzyl) diphenyl amine | 0.55 gm |

From the ratios of starting materials the copolymer is calculated to have the composition 40 percent (wt) tetramethylene terephthalate/12.9 percent (wt)tetramethylene octylsuccinate/37.2 percent (wt)poly(tetramethylene ether)terephthalate/9.8 percent (wt)poly(tetramethylene ether) octylsuccinate.

Physical properties were obtained on copolymer samples compression molded at about 215°C. Copolymer properties are listed in Table II under Column A.

EXAMPLE 5

The copolymerization is carried out in a manner similar to that of Example 1 using the following materials:

| | |
|---|---|
| Poly(tetramethylene ether) glycol; number average molecular weight about 976 | 19.1 gm |
| 1,4-Butanediol | 16.9 gm |
| Dimethyl terephthalate | 22.4 gm |
| Dimethyl octadecylsuccinate | 10.2 gm |
| 4,4'-Bis(α,α-dimethylbenzyl)diphenyl amine | 0.55 gm |

From the ratios of starting materials the copolymer is calculated to have the composition 40 percent (wt)tetramethylene terephthalate/19.3 percent (wt)tetramethylene octadecylsuccinate/31.4 percent (wt)poly(tetramethylene ether)terephthalate/9.3 percent (wt)poly(tetramethylene ether) octadecylsuccinate.

Physical properties were obtained on copolymer samples compression molded at about 215°C. Copolymer properties are listed in Table II under Column B.

EXAMPLE 6

The copolymerization is carried out in a manner similar to that of Example 1 using the following materials:

| | |
|---|---|
| Poly(tetramethylene ether) glycol; number average molecular weight about 976 | 25.6 gm |
| 1,4-Butanediol | 16.9 gm |
| Dimethyl terephthalate | 23.4 gm |
| Succinic anhydride | 3.0 gm |
| 4,4'-Bis(α,α-dimethylbenzyl)diphenyl amine | ˙0.55 gm |

From the ratios of starting materials the copolymer is calculated to have the composition 40 percent (wt) tetramethylene terephthalate/7.8 percent (wt)tetramethylene succinate/42.1 percent (wt)poly(tetramethylene ether)terephthalate/10.1 percent (wt)poly(tetramethylene ether) succinate. This composition, while employing two acids, is outside the scope of the invention because none of the raw materials bear the required side chain.

Physical properties were obtained on copolymer samples compression molded at about 215°C. Copolymer properties are listed in Table II under Column C. The decrease in tear strength and increase in hardness should be noted.

EXAMPLE 7

The copolymerization is carried out in a manner similar to that of Example 1 using the following materials:

| | |
|---|---|
| Poly(tetramethylene ether) glycol; number average molecular weight about 984 | 29.1 gm |
| 1,4-Butanediol | 18.0 gm |
| Dimethyl terephthalate | 25.2 gm |
| N,N'-Di-beta-naphthyl-p-phenylenediamine | 0.17 gm |

From the ratios of starting materials the copolymer is calculated to have the composition 40 percent (wt) tetramethylene terephthalate/60 percent (wt)poly)tetramethylene ether)terephthalate. This composition is outside the scope of the invention.

Physical properties were obtained on copolymer samples compression molded at about 215°C. Copolymer properties are listed in Table II under Column D. Again the decrease in tear strength and increase in hardness should be noted for C and D.

Table II

| Polymer | A | B | C | D |
|---|---|---|---|---|
| Tetramethylene terephthalate (wt.%) | 40 | 40 | 40 | 40 |
| % Short chain ester units with side chains | 20 | 20 | 0 | 0 |
| (Terephthalate/second ester) mole ratio | 4.0 | 4.0 | 4.0 | infinity |
| Inherent viscosity | 1.9 | 1.2 | 2.4 | 1.6 |
| $M_{100}$ | 990 | 905 | 1010 | 1210 |
| $M_{300}$ | 1200 | 1120 | 1350 | 1590 |
| $T_B$ | 6450 | 6200 | 5250 | 4500 |
| $E_B$ | 810 | 715 | 735 | 830 |
| DSC m.p. (°C) | 157 | 155 | 151 | 172 |
| Shore D hardness | 38 | 39 | 44 | 44 |
| Tear strength, 50 in/min | 246 | 382 | 155 | 147 | a. The compositions of polymers C and D are outside the scope of the invention.

What is claimed is:

1. A segmented thermoplastic copolyetherester having improved tear strength consisting essentially of a multiplicity of recurring long chain ester units and short chain ester units joined head-to-tail through ester linkages, said long chain ester units being represented by at least one of the formulae:

(a)     or     (a')

and said short chain ester units being represented by the formula:

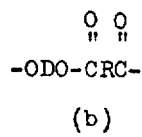

(b)

and at least one other formula selected from the group consisting of:

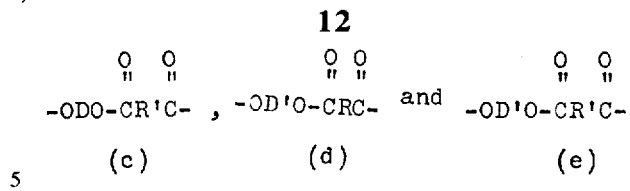

(c)      (d)      (e)

wherein:

G is a divalent radical remaining after the removal of terminal hydroxyl groups from a long chain glycol having a molecular weight of about 400–6000 and a carbon-to-oxygen ratio of about 2.0–4.3;

R is a divalent radical remaining after removal of carboxyl groups from a dicarboxylic acid having a molecular weight less than about 300;

R' is a divalent radical, containing at least one side chain of 7 to about 25 carbon atoms in length, remaining after removal of carboxyl groups from an aliphatic dicarboxylic acid, said aliphatic dicarboxylic acid having a molecular weight of less than about 300 neglecting the side chains;

D is a divalent radical remaining after removal of hydroxyl groups from a diol a molecular weight less than about 250; and D' is a divalent radical, having at least one side chain of 7 to about 25 carbon atoms in length, remaining after removal of hydroxyl groups from a low molecular diol, said diol having a molecular weight of less than about 250 neglecting the side chains; provided, (a) said short chain units amount to about 25 to 90 percent by weight of said copolyester; (b) about 5 to 55 percent of the total number of said short chain ester units contained in said copolyetherester have said side chains; and (c) a homopolymer in the fiber-forming molecular weight range formed solely from the short-chain ester units without side chains has a melting point of at least 150°C.

2. The composition of claim 1 wherein D is derived from a diol having 2 to 8 carbon atoms.

3. The composition of claim 1 wherein the branched short chain ester units are represented by the formula (e) and the side chain or chains are aliphatic or cycloaliphatic.

4. The composition of claim 3 wherein there is a single side chain of 8 to 22 carbon atoms.

5. The composition of claim 1 wherein R is derived from a $C_8$–$C_{16}$ aromatic dicarboxylic acid.

6. The composition of claim 1 wherein R is derived from a dicarboxylic acid selected from terephthalic and isophthalic acid and their dimethyl esters.

7. The composition of claim 1 wherein R' is derived from an α-substituted succinic acid.

8. The composition of claim 7 wherein the α-substituents are alkyl or alkenyl radicals containing from 8 to 24 carbon atoms.

9. The composition of claim 1 wherein the glycol is a poly(tetramethylene oxide) glycol having a molecular weight of about 600–2000.

10. The composition of claim 1 wherein said copolyetherester is formed from a poly(tetramethylene oxide) glycol having a molecular weight of about 600–2000, 1,4-butanediol, terephthalic acid or its dimethylester and substituted succinic acid having an α-alkyl or α-alkenyl radical containing from 8 to 22 carbon atoms.

11. The composition of claim 10 wherein the α-alkyl or α-alkenyl radical is selected from dodecyl or dodecenyl.

* * * * *

UNITED STATES PATENT OFFICE
CERTIFICATE OF CORRECTION

Patent No. 3,891,604     Dated  June 24, 1975

Inventor(s)  James Richard Wolfe, Jr.

It is certified that error appears in the above-identified patent and that said Letters Patent are hereby corrected as shown below:

Claim 1, Column 12, line 22

After "diol" insert -- having --.

Signed and Sealed this tenth Day of February 1976

[SEAL]

Attest:

RUTH C. MASON
*Attesting Officer*

C. MARSHALL DANN
*Commissioner of Patents and Trademarks*